UNITED STATES PATENT OFFICE.

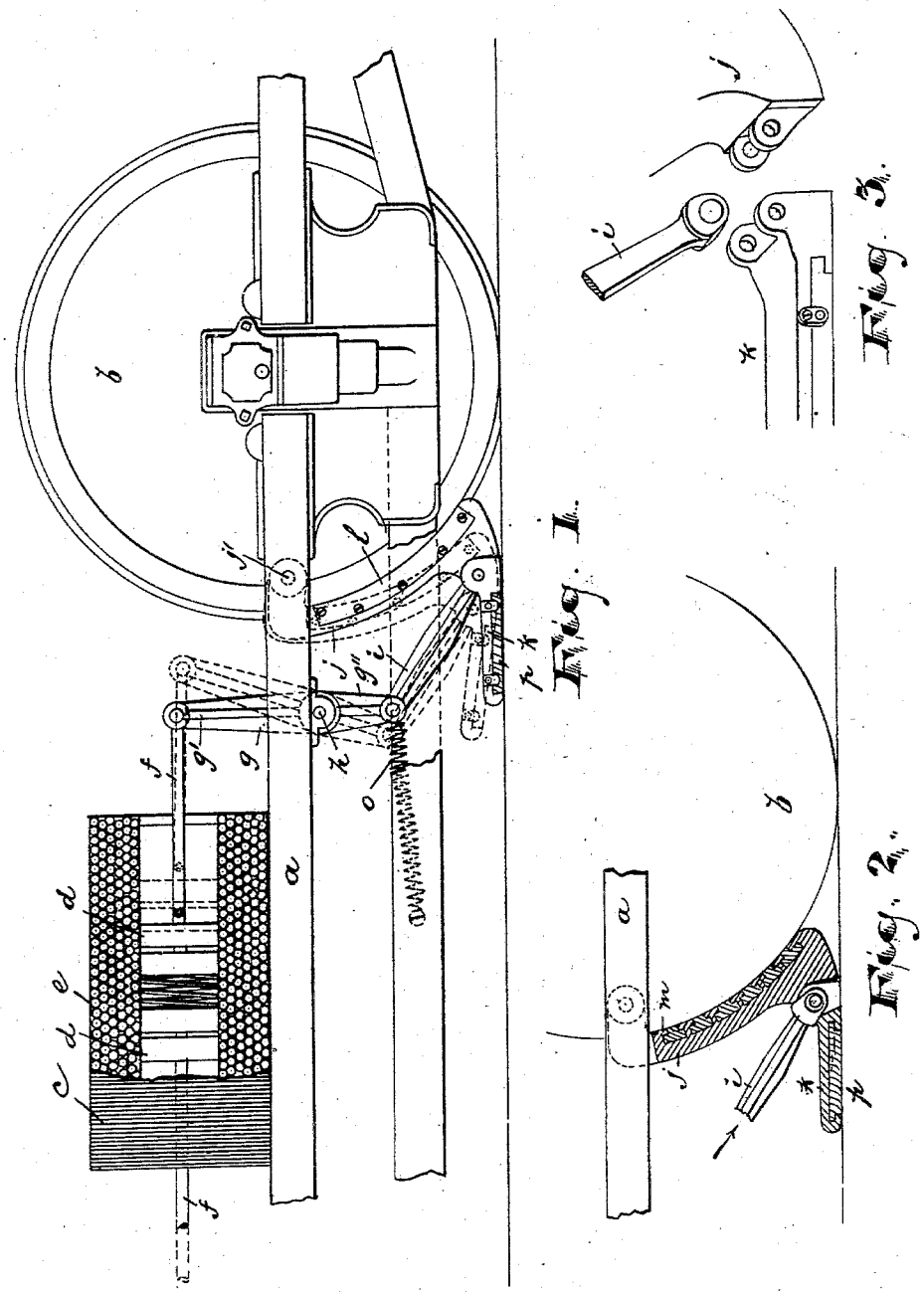

WALTER V. ASH, OF IRVINGTON, NEW JERSEY.

BRAKE FOR ELECTRIC CARS.

SPECIFICATION forming part of Letters Patent No. 563,725, dated July 14, 1896.

Application filed August 5, 1895. Serial No. 558,185. (No model.)

*To all whom it may concern:*

Be it known that I, WALTER V. ASH, a citizen of the United States, residing at Irvington, in the county of Essex and State of New Jersey, have invented certain new and useful Improvements in Brakes for Electric Cars; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in that class of railway-car brakes in which the braking-shoes are in pivoted sections or parts, one part being adapted to engage the rail and the other the periphery of the wheel when pressure is brought to bear thereon.

The object of the improved construction is to secure a more powerful application of braking force to the wheels and track, to provide a more simple and durable construction, and to secure other advantages and results, some of which may be referred to hereinafter in connection with the description of the working parts.

The invention consists in the improved electric rail or tramway-car brake, and in the arrangements and combinations of the parts thereof, all substantially as will be hereinafter set forth and finally embraced in the clauses of the claim.

Referring to the accompanying drawings, in which like letters of reference indicate corresponding parts in each of the views, Figure 1 is a side elevation of a portion of a car having my improvements, a certain solenoid being shown partly in section. Fig. 2 is a sectional detail showing more clearly the construction of the shoe and its mode of engaging the car-wheel and the tread of the rail, and Fig. 3 is a perspective detail showing more clearly the construction at the joint formed by the connection of certain shoe-sections with an operating-rod.

In said drawings, $a$ indicates a portion of the truck or frame of the car, upon which are arranged the ordinary journal-bearings for the wheel $b$; the said frame or truck and the wheel or wheels being of any construction now common in the art or which may hereafter be provided. To said truck or frame of the car, or upon the car in any suitable position, is secured, in any manner common in mechanics, a solenoid $c$, in which is arranged a core, piston or plunger $d$, or a plurality of the same where the brakes are applied to both forward and rear wheels. Said plunger or piston is adapted to be operated upon by the coil $e$ in the manner common in electrical solenoids, the coil of live wire tending to attract the piston to the central part of the solenoid-chamber, as will be understood. The coiled wire $e$ is in electrical connection with the wires or connections of the electrical motive system of the car, and the passage of electricity is controlled by any suitable device for braking or closing the circuit connection, such as are now in common use or such as may be hereafter devised.

In connection with the plunger $d$ I provide the connecting-rod $f$, which is pivoted to the longer arm $g'$ of a lever $g$, the latter being fulcrumed, as at $h$, upon the car frame or truck. The shorter arm of the lever $g''$ is pivoted upon or connected to a connecting-rod $i$, which extends downwardly and inclines toward the lower side of the car-wheel $b$, and engages the compound or duplex shoe hereinafter described. The said shoe consists of two friction sections or pieces $j$ and $k$, the first of which consists of a curved piece of metal fulcrumed upon the frame of the car, as at $j'$, and extending downward and conforming to the periphery of the wheel, so as to present thereto a broad or extended contact-surface suited to retard or stop the rotary movement of the wheel. Said curved section or piece may be provided with an interchangeable or separable contact-piece $l$, which is preferably of wood, although, under some conditions, I may employ iron in connection with the wood, the iron and wood being in alternate layers and being held in position by clamping-plates at the sides of the shoe in any suitable manner. By means of the iron and wood alternating, as described, the durability of the shoe is materially increased.

At the lower end of the curved shoe portion $j$ is pivoted the portion $k$, which is adapted to lie flat upon the tread of the track and present to said tread a frictional surface, by means of which the car is prevented from sliding upon the track when the brakes are applied. This portion $k$ is also provided with a removable or separate friction portion $p$, which is preferably of wood, although, as in the former case, it may be of wood and metal in layers. These inserted contact-pieces in the portions $j$ and $k$ are held from slipping by bosses, lugs, or other suitable means, formed within the chambers or receptacles for said pieces, as at $m$, which serve, in connection with the clamps, to hold the friction-pieces in position. The shoe portion $k$ is so pivoted upon the portion $j$ as that the former has but a limited pivotal movement, the joint being formed to prevent said portion $k$ from dropping below a horizontal line; but the joint admits of the said portion $k$ turning at its free end upward, and thus, when the plunger $d$ of the solenoid is moved inward upon the closing of the circuit and the transmission of a current through the winding wires, and the lever $g$ is turned on its pivot or fulcrum, so as to force the connecting-rod $i$ forward toward the wheel, the pressure of the said forwardly and downwardly extending rod $i$ is brought to bear both upon the parts $j$ and $k$ equally, or nearly so, and the friction is applied to both the wheel and the track simultaneously and equally or nearly so, as will be understood upon reference to Fig. 2. The pivot which joins the shoes together being in the line of pressure of the rod $i$, and the said rod being directed into the angle formed by the wheel and track, the wedge power tending to elevate the wheel and prevent the flattening effect of its sliding on the track is increased or is greater than if said rod $i$ were directed against one shoe-section, or the other, back from the joint. The connecting-rod $i$, being loosely pivoted on the pin which couples the shoe-sections, as shown in Fig. 2, and being at its lower end somewhat of a wedge shape, the freedom of pivotal movement of one section on the other will not be admitted during the forward pressure of said connecting-rod. Upon the opposite movements of the said parts, when the curved portion $j$ is removed from pressing against the wheel, the part $k$ is raised from the track and will not, because of its limited movement on the section $j$, drop at its free end and remain in contact with the rail.

I employ a spring, either within the solenoid, bearing oppositely against the plungers $d$ $d$, or at the point at which the parts $g$ and $i$ are connected. This spring or springs normally holds the brake-shoe away from contact with the rail and wheel. I prefer to employ a spring $o$ outside of the solenoid in connection with the lever $g$, but I may employ the spring in either position, or in both, to secure the desired movement of the shoe.

I provide at the upper end of the shoe-section $j$ a horizontal turn or bend in said section, so that I may pivot the said section at a point in a vertical line with its point of connection with the connecting-rod $i$, and thus, when the backward draft is brought to bear upon the said sections $j$ and $k$, there will be an immediate upward movement of the section $k$ from the rail-tread. The one pivot which connects the two sections also serves in connecting the rod $i$ thereto. To prevent binding, I prefer to enlarge the pivotal perforation in the section $i$, as in Fig. 2.

Having thus described the invention, what I claim as new is—

1. The combination with the car and brake-operating means, of a lever at one end receiving power from said means and intermediately fulcrumed upon the car, a connecting-rod pivoted to the other end of said lever and being wedge-shaped where it receives the brake-shoe, a brake-shoe in sections to engage the wheel and track, and loosely attached to said connecting-rod and adapted to be wedged by said connecting-rod, one section into rigid relation with the other, and a spring to normally hold said shoe away from said wheel and track, substantially as set forth.

2. The combination with the car, and brake-operating means, of a connecting-rod and two shoe-sections one to engage the track and the other the wheel, said sections being pivoted to one another, and to said connecting-rod, the wheel-section at its upper end being bent and extending within the peripheral line of the wheel toward the center of said wheel, and at the extremity being pivoted to the car, substantially as set forth.

3. The combination with the wheeled car, having the frame or truck $a$, of a solenoid fastened to said truck or frame, and having a core, plunger or piston $d$ and rod $f$, a lever $g$, fulcrumed upon said frame or truck, the longer arm of which lever is pivoted to said piston-rod $d$, the shorter arm to a downwardly-inclined connecting-rod $i$, and a brake-shoe having parts $k$, $l$, pivoted together and to the lower end of said downwardly-inclined connecting-rod, the part $k$, being adapted to engage the track and the part $l$ at its upper end being bent toward the wheel as shown, and at its bent extremity being pivoted to the frame, and a spring $o$, adapted to normally hold the shoe away from braking relation to the track and wheel, substantially as set forth.

4. In a brake, the combination with operating means, of the rod, $i$, wedge-shaped at its lower end, a track shoe-section, a wheel shoe-section, and a pivot connecting said parts, the wedge-shaped end being loose in its relation to the shoe-sections and lying between the same, and free to force said sections to turn on the pivot oppositely toward the track and wheel respectively, substantially as set forth.

In testimony that I claim the foregoing I have hereunto set my hand this 26th day of July, 1895.

WALTER V. ASH.

Witnesses:
CHARLES H. PELL,
BEATRICE CHARLES.